US011738353B2

(12) United States Patent
Rotzinger et al.

(10) Patent No.: US 11,738,353 B2
(45) Date of Patent: Aug. 29, 2023

(54) SYSTEM AND METHOD OF CONCENTRATING NIOBIUM ORE

(71) Applicant: Aley Corporation, Vancouver (CA)

(72) Inventors: Robert Rotzinger, West Vancouver (CA); Keith Merriam, Pitt Meadows (CA)

(73) Assignee: Taseko Mines Limited, Vancouver (CA)

(*) Notice: Subject to any disclaimer, the term of this patent is extended or adjusted under 35 U.S.C. 154(b) by 933 days.

(21) Appl. No.: 16/603,446

(22) PCT Filed: Apr. 6, 2018

(86) PCT No.: PCT/CA2018/000069
§ 371 (c)(1),
(2) Date: Oct. 7, 2019

(87) PCT Pub. No.: WO2018/184094
PCT Pub. Date: Oct. 11, 2018

(65) Prior Publication Data
US 2020/0147620 A1 May 14, 2020

Related U.S. Application Data

(60) Provisional application No. 62/482,772, filed on Apr. 7, 2017.

(51) Int. Cl.
*B03D 1/018* (2006.01)
*C22B 1/00* (2006.01)
(Continued)

(52) U.S. Cl.
CPC .............. *B03D 1/018* (2013.01); *C22B 1/005* (2013.01); *C22B 34/24* (2013.01); *B03D 1/16* (2013.01);
(Continued)

(58) Field of Classification Search
CPC ............ B03D 1/018; B03D 1/16; B03D 1/02; B03D 1/002; B03D 1/01; B03D 2201/007;
(Continued)

(56) References Cited

U.S. PATENT DOCUMENTS

2017/0144168 A1* 5/2017 Bhambhani ............ B03D 1/012
2018/0071752 A1* 3/2018 Moore .................... B03D 1/01

FOREIGN PATENT DOCUMENTS

CN 107694763 A * 2/2018 .............. B03D 1/01

OTHER PUBLICATIONS

A Tof-SIMS analysis of the effect of lead nitrate on rare earth flotation, Xia et al. Mineral Engineeing 70 (2015) 119-129 Oct. 3, 2014 Elsevier. (Year: 2014).*
Huang Yulin et al., "General Situation of Research on Flotation Reagents of Tantalum-Niobium Minerals", Chinese Journal of Rare Metals, vol. 30, No. 6, pp. 870-876. Su Chengde et al., "Technical Explanation of Beneficiation Operation.," Hebei Science and Technology Press, p. 192, Aug. 1999.
(Continued)

*Primary Examiner* — Michael McCullough
*Assistant Examiner* — Kalyanavenkateshware Kumar
(74) *Attorney, Agent, or Firm* — McMillan LLP; Keith Bird

(57) ABSTRACT

Methods for niobium concentration from a carbonatite host rock are presented. A basic process for niobium mineral concentration involves performing niobium mineral flotation, on a sufficiently liberated ore slurry, using at one least aromatic hydroxamate collector; and at least one lead salt as a performance modifier. A more optimized process further includes dispersion. A further optimized process includes: magnetic separation, dispersion, sulphide removal, fine suspended particle removal, and niobium cleaner flotation stages. The use of one of number of tested lead salts during
(Continued)

flotation improves the yield, and lowers the cost as a significantly lower amount of the collector is required. The process is useful for recovering a variety of species of niobium minerals such as fersmite, pyrochlore, columbite, fergusonite, niobium-containing rutile, and niobium-containing ilmenite.

47 Claims, 4 Drawing Sheets

(51) Int. Cl.
    *C22B 34/24*     (2006.01)
    *B03D 1/16*     (2006.01)

(52) U.S. Cl.
    CPC .... *B03D 2201/007* (2013.01); *B03D 2201/02* (2013.01); *B03D 2201/04* (2013.01); *B03D 2203/04* (2013.01)

(58) Field of Classification Search
    CPC ............ B03D 2201/02; B03D 2201/04; B03D 2203/04; C22B 1/005
    See application file for complete search history.

(56) References Cited

OTHER PUBLICATIONS

Jordans Adam et al: "Benefication of the Nechalacho rare earth deposit: Flotation response using benzohydromaxic acid" Minerals Engineering, Elsevier, Amsterdam NL vol. 99 Sep. 9, 2016 (pp. 158 to 169).

Brian R. Hardt et al: "REE bearing mineral recover: a microfloatation and surface chemistry stufy using hyroxamate collectors and citric acid" IMPC 2014 Oct. 20, 2014, (pp. 1 to 13).

Tian Mengjie et al.: "Study on the mechanism and application of a novel collector-complexes in cassiterite floatation" Colloids and Surfaces a: Physiolochemical and Engineering Aspects. Elsevier Amsterdam NL. col. 522 Feb. 22, 2017 (pp. 635 to 641).

A Tof-SIMS analysis of the effect of lead nitrate on rare earth flotation, Xia et al. Mineral Engineeing 70 (2015) 119-129 Oct. 3, 2014 Elsevier.

REE bearing mineral recovery: a microflotation and surface chemistry study hydroamate collectors and citric acid, IMPC 2014, Hart et al. Research Scientists: Surface Science Western, University of Western Ontarion, Research and Technology Park.

Direct Flotation of Niobium Oxide Minerals from Carbonatite Niobium Ores, Ni Xiao, University of Alberta 2013.

Niobium Oxide Mineral Flotation: A Review of relevant literature and the current state of industrial operations, International Journal of Mineral Processing vol. 137, Apr. 10, 2015, pp. 82-97.

* cited by examiner

SYSTEM AND METHOD OF CONCENTRATING NIOBIUM ORE

FIELD OF THE INVENTION

The present invention relates generally to concentration of minerals and more specifically to concentration by direct flotation of niobium-bearing minerals from a carbonatite host rock.

BACKGROUND OF THE INVENTION

Niobium, formerly columbium, is a chemical element with symbol Nb (formerly Cb) and atomic number 41. It is a soft, grey, ductile transition metal, which is often found in the minerals: pyrochlore, columbite, and fersmite. The largest current use of niobium is in High Strength Low Alloy (HSLA) and Advanced High Strength Steel (AHSS) grades of steel where a small percentage (0.005 to 3.0%) of niobium added as an alloying element enhances the strength of steel produced. The temperature stability of niobium-containing alloys is also important for its use in superalloys for jet engine and rocket engine components. Other applications of niobium include superconducting materials, welding, nuclear technology, electronics, optics, and jewelry.

Known processes for concentrating niobium minerals from carbonatite niobium ores include commonplace mineral processing steps such as comminution, magnetic separation, de-sliming, and flotation of sulphide minerals in addition to the core process steps of apatite/carbonate mineral flotation prior to niobium mineral flotation, and niobium mineral flotation itself. Note that the term carbonate mineral is a designation commonly used to refer to a wide range of individual mineral species associated with carbonatite mineral assemblages, and that its usage in this document is intended to denote the range of these minerals.

The known process includes comminution by various technologies to achieve adequate mineral liberation to allow separation of the ore minerals as well as one or more commonplace ancillary separation stages for removal of undesirable minerals which affect one or more of the core process' recovery of niobium minerals, consumption of reagents and/or mineral concentrate quality. Typical common ancillary processes include sulphide mineral removal by flotation conducted prior to and/or after niobium mineral flotation; de-sliming for removal of fine particles at one or more stages of the process; and one or more stages of magnetic separation prior to, mid-process, and/or after niobium mineral flotation. The core apatite/carbonate mineral flotation stage in the known process utilizes tall oil and/or fatty acid collectors, sodium silicate or other dispersants, and pH control via sodium carbonate or other suitable base to remove a large proportion of the carbonatite gangue material from the ore prior to acidification of the remaining ore for niobium mineral flotation. The apatite/carbonate mineral flotation stage typically involves a flotation rougher circuit and one or more cleaner flotation circuits operating in closed and/or open circuit. The niobium mineral flotation stage utilizes fluorosilicic acid and a tall oil/fatty acid collector to perform niobium mineral flotation under acidic conditions. The niobium mineral flotation stage may use other acids to assist in pH control and typically consists of rougher flotation circuit followed by multiple (5-8) closed and/or open flotation cleaner circuits, with pH being generally reduced through each subsequent cleaner flotation stage. The known process typically results in recovery of under 60% of the niobium bearing minerals. Mineralogical characteristics of the ore can have significant impact on recovery to final product, with industrial performance typically ranging from 30 to 70% on different geological domains within a single ore body.

Emerging laboratory scale processes by others for direct niobium mineral flotation (i.e. niobium mineral flotation without prior removal of apatite and carbonate minerals) typically use chemically pure (>99%) benzohydroxamic acid as a flotation collector and have resulted in high mass yield, low grade niobium concentrates with high reagent consumptions. Work on an emerging process by Xiao Ni recovered 95% of the niobium bearing minerals into a concentrate with a mass yield of 47% (Xiao Ni, 2013). Work on a similar emerging process by Gibson et. al. produced a 3% $Nb_2O_5$ concentrate with an 80% recovery and a 6.5% mass yield (Gibson, 2014). Note that $Nb_2O_5$ is the assay designation commonly used to refer to the niobium content of niobium ores and mineral concentrates, and that its usage in this document is intended to denote a range of niobium bearing minerals.

The focus of the known processes has been the recovery of pyrochlore and columbite, the predominant commercially exploited mineral species of niobium. The recovery of columbite in the known process route is typically lower than the recovery of pyrochlore. No reference has been found in the prior art in relation to the flotation recovery of the niobium mineral fersmite.

It is an object of this invention to provide a new direct flotation process for recovery of niobium minerals which is successful at recovering all of the identified niobium mineral species, namely pyrochlore, columbite, fersmite, and fergusonite as well as niobium bearing rutile and ilmenite minerals from carbonatite ore into a high grade, low mass yield concentrate suitable for subsequent processing into a range of niobium products.

It is another object of the present invention to provide a new direct flotation process for recovery of niobium bearing minerals in which overall process complexity is reduced through the removal of the requirement for a carbonate mineral species removal process prior to niobium mineral flotation as is the standard in known industrial processes.

It is another object of the present invention to provide a new direct flotation process for recovery of niobium minerals in which reagent consumption requirements are reduced compared to the known emerging processes.

SUMMARY OF THE INVENTION

In one aspect of the present invention there is provided a process for niobium mineral concentration comprising performing niobium mineral flotation, on a sufficiently liberated ore slurry, using at one least aromatic hydroxamate collector, and at least one lead salt as a performance modifier.

The at least one aromatic hydroxamate collector is selected from the group consisting of: benzohydroxamic acid, naphthenic hydroxamic acid, and salicylic hydroxamic acid; and the at least one lead salt is selected from the group consisting of: lead nitrate, lead acetate, lead chloride, lead format, lead citrate, and lead hydroxide.

The aromatic hydroxamate collector may be benzohydroxamic acid, naphthenic hydroxamic acid, or salicylic hydroxamic acid.

The lead salt may be lead nitrate, lead acetate, lead chloride, lead formate, lead citrate, or lead hydroxide.

The lead salt performance modifier may be added to the liberated ore slurry before or after the aromatic hydroxamate collector is added. Alternatively, the lead salt performance modifier, and the aromatic hydroxamate collector are added to the liberated ore slurry at the same time.

The liberated ore slurry may contain pyrochlore, fersmite, columbite, fergusonite, niobium-containing rutile, or niobium-containing ilmenite.

The niobium mineral flotation performed on the liberated ore slurry may be performed at a flotation temperature of between 15 degrees Celsius to 60 degrees Celsius, or at a flotation temperature between 30 degrees Celsius and 40 degrees Celsius.

The niobium mineral flotation may be performed on the liberated ore slurry at a pH range of 6.5 to 10.0. Alternatively, the niobium mineral flotation may be performed on the liberated ore slurry at a pH range of 6.9 to 8.5. The natural pH of the ore may fall within this range or it may need to be adjusted to fall within the specified range.

The process for niobium mineral concentration may further comprise mixing sufficiently liberated ore particles with water to produce the sufficiently liberated ore slurry, prior to performing the niobium mineral flotation. The process may also comprise comminution of a host rock to produce the sufficiently liberated ore particles.

The process for niobium mineral concentration may further comprise performing magnetic separation on the liberated ore slurry for separating magnetic and/or paramagnetic material from nonmagnetic material.

The process for niobium mineral concentration may further comprise adding at least one chemical with dispersing properties. The least one chemical with dispersing properties may be sodium hexametaphosphate, sodium tripolyphosphate, carboxymethyl cellulose, or polycarboxylic acid.

The process for niobium mineral concentration may further comprise partial physical removal of suspensions of fine particles or dispersed suspensions of fine particles.

The process for niobium mineral concentration may further comprise sulphide removal by flotation.

The process for niobium mineral concentration may further comprise conditioning of the sufficiently liberated ore slurry with at least one aromatic hydroxamic acid, and at least one lead salt prior to the niobium mineral flotation.

The at least one aromatic hydroxamate collector used for conditioning is selected from the group consisting of: benzohydroxamic acid, naphthenic hydroxamic acid, and salicylic hydroxamic acid; and the at least one lead salt used for conditioning is selected from the group consisting of: lead nitrate, lead acetate, lead chloride, lead format, lead citrate, and lead hydroxide.

The at least one aromatic hydroxamate collector used for conditioning may be: benzohydroxamic acid, naphthenic hydroxamic acid, or salicylic hydroxamic acid.

The at least one lead salt used for conditioning may be: lead nitrate, lead acetate, lead chloride, lead formate, lead citrate, or lead hydroxide.

The process for niobium mineral concentration may further comprise cleaner flotation of niobium for concentrate upgrading.

BRIEF DESCRIPTION OF THE DRAWINGS

Embodiments of the present invention will be described, by way of example only, with reference to the attached figures, wherein.

DETAILED DESCRIPTION OF THE EMBODIMENTS

While the Background of Invention described above has identified particular problems known in the prior art, the present invention provides a new and useful process for niobium mineral concentration.

Figure 1:
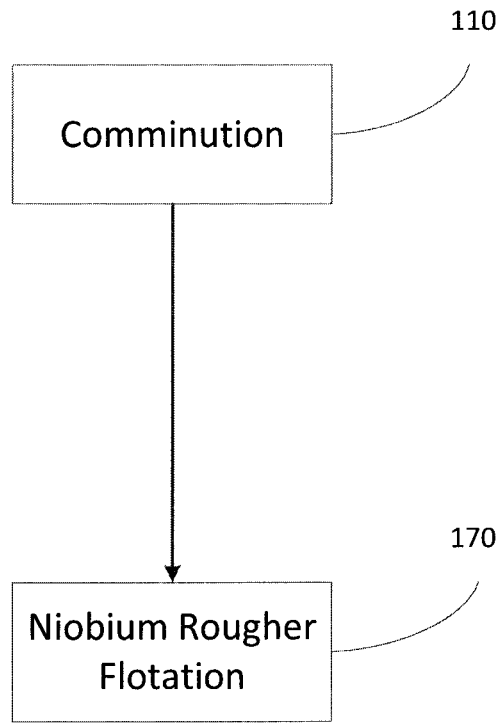
FIG. 1 shows a simplified process flow diagram for niobium concentration in accordance with an embodiment of the present invention.
Figure 2:
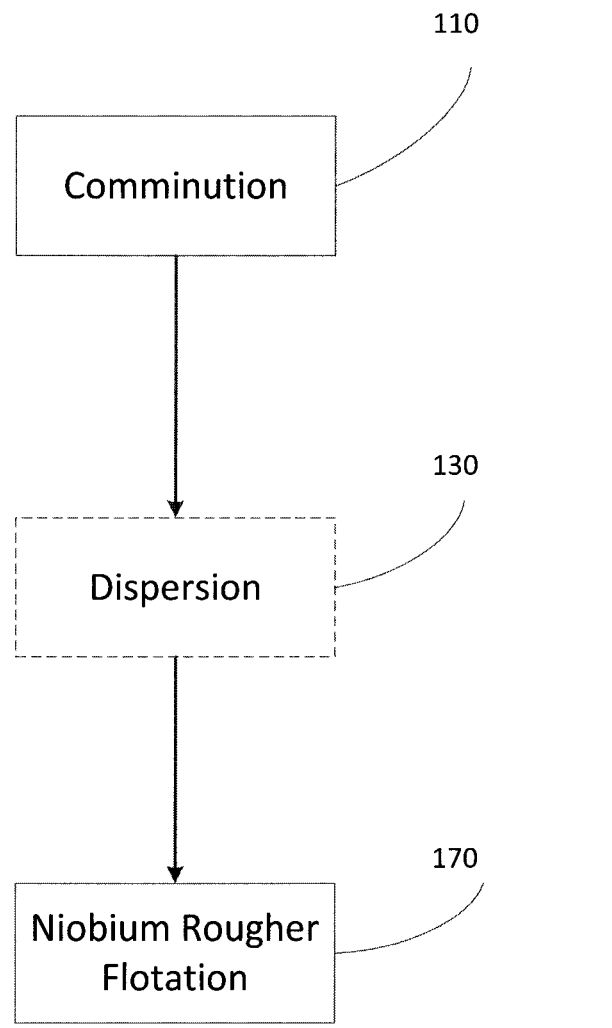
FIG. 2 shows an optimized process flow diagram for niobium concentration in accordance with another embodiment of the present invention.
Figure 3:
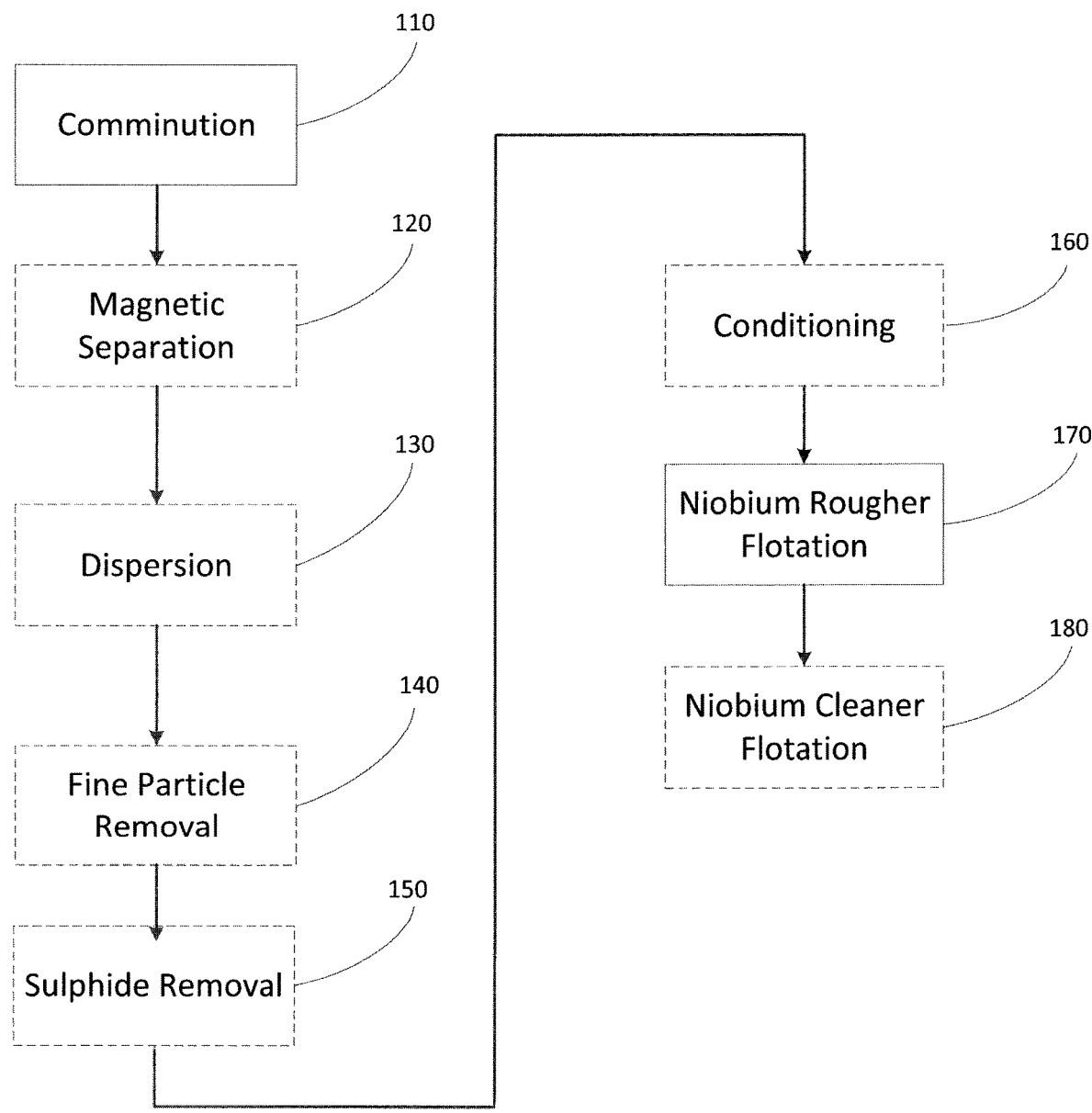
FIG. 3 shows an optimized process flow diagram for niobium concentration in accordance with yet another embodiment of the present invention.
Figure 4:
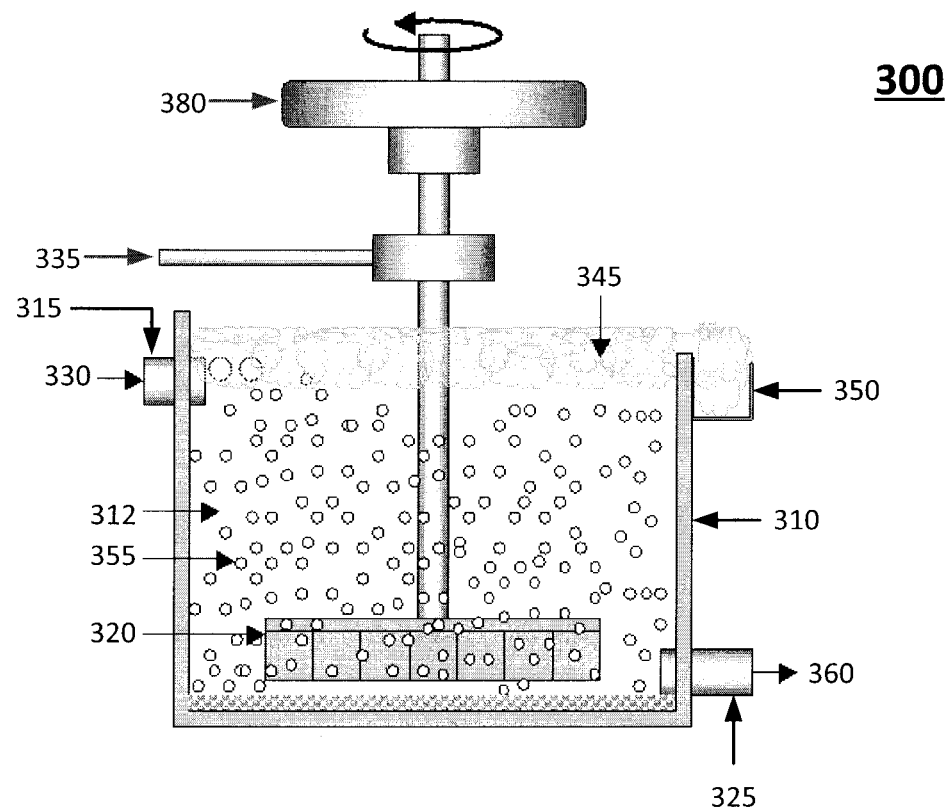
FIG. 4 shows a prior art process of separating a mineral from a feed by froth flotation.

FIG. 1 depicts a process flow diagram for a basic niobium concentration process 1000 in accordance with an embodiment of the present invention. Basic niobium concentration process 1000 comprises steps 110, and 170. It should be apparent to those of skill in the art, that step 110 is not necessary if sufficiently liberated ore slurry is available and is provided to process step 170. FIG. 2 depicts a process flow diagram for an optimized niobium concentration process 2000 in accordance with another embodiment of the present invention. Optimized niobium concentration process 2000 comprises steps 110, 130, and 170. Step 130 is depicted in dashed lines to indicate that it is optional for some ores where gangue mineral recovery to concentrate is low. However, it has been found that step 130 is beneficial for some other ores where gangue mineral recovery to concentrate is high and the effectiveness of the process is significantly reduced. FIG. 3 depicts a process flow diagram for an optimized niobium concentration process 3000 in accordance with yet another embodiment of the present invention. Optimized niobium concentration process 3000 comprises steps 110 to 190. Process steps 120 to 160 and 180 are depicted in dashed lines to indicate that they are optional. It should be apparent to those skilled in the art that other processes may be contemplated that contain the steps of basic niobium concentration process 1000, and one or more of steps: 120 to 160, and 180. Some exceptions apply such as when a process step depends on the output of a prior step, as will be detailed below. All of basic process 1000, and optimized processes 2000 and 3000, are for extracting niobium minerals from a carbonatite host rock. The disclosed niobium concentration processes 1000, 2000, and 3000 include a froth flotation step which may be carried out by one or more systems as known to persons skilled in the art. FIG. 4 shows a prior art 300 process of separating a mineral by froth flotation using an representative system. The process 300 is carried out in tank 310, filled with an aqua solution, and having an inlet 315 and an outlet 325. Feed 330, comprised of the desired mineral and other components, is fed into tank 310 via inlet 315. The desired mineral is presumed to be a hydrophobic mineral or a mineral which can be made hydrophobic by the addition of suitable reagents. A hydrophobic mineral has a hydrophobic effect which causes the mineral to separate from water and cling to air bubbles for example. If the mineral is not hydrophobic, then a collector is added to the feed (not shown). The collector attaches to the surface of the mineral forming a water repellent film thus increasing the hydrophobicity of the mineral. Air 335 is fed into the tank 310 for forming air bubbles 355. An agitator 320 is rotated, via motor and drive 380 at a suitable speed to suspend a slurry of the feed and the aqua solution 312. The desired mineral clings to air bubbles 355 and floats to the surface of the tank 310 forming froth 345 typically enhanced by the addition of frothing agents. Froth 345 collects in concentrate launder 350 where some air bubbles 355 burst and a concentrate 360 comprising, for the most part, mineral 331 remains and aqua solution. Tailings 360 comprising other feed components exit tank 310 via outlet 325.

Turning now to FIGS. 1-3 which describe the steps for the disclosed process for niobium concentration. The first process step 110 is comminution. Comminution is the process whereby the particle size of the ore is reduced. There are no unique features to the application of comminution in the disclosed process. This particle size reduction is conducted in order to achieve sufficient liberation of the niobium bearing minerals from the carbonatite host rock and other gangue minerals to allow subsequent process stages to effectively separate the niobium minerals. The extent of comminution required will vary with the ore source and the physical properties of that particular ore.

Comminution is conducted by crushing the carbonatite and/or grinding the carbonatite ore. Comminution may involve a single stage or multi stage size reduction, with or without size classification. Comminution may also be conducted after an intermediate concentration stage, commonly referred to as regrinding, followed by further selective mineral separation.

Comminution is conducted in order to produce a sufficiently liberated ore. Liberation of the niobium bearing minerals from the carbonatite host rock and other gangue minerals is considered sufficient when the minerals presented to subsequent process stages have adequate exposure and composition to allow the minerals to be separated. These subsequent process stage(s) may include particle size reduction to further alter the extent of mineral liberation. Sufficiently liberated ore is mixed with water to form a slurry prior to flotation processes.

The disclosed process was developed via a test work program on a specific niobium bearing ore. During development, comminution was undertaken with a variety of particle size targets from 25 µm to 200 µm. An optimized comminution target of 50 µm to 60 µm was selected based on the specific mineral liberation characteristics of the ore used. Comminution and all subsequent stages were conducted on slurries of ore and water in the optimized process.

Although achieving adequate mineral liberation is an essential step, comminution may not be required if the ore used as an input to the process has been pre-ground or is naturally liberated. In these cases, the step of comminution (110) becomes an optional step.

At step 120, which is an optional step, magnetic separation is performed. Magnetic separation is a process whereby magnetic and/or paramagnetic materials are separated from the non-magnetic minerals in the ore. This step may be carried out if the ore contains magnetic gangue minerals such as magnetite. In the disclosed process magnetite is partially recovered with the niobium bearing minerals if the magnetite is not removed prior to niobium mineral flotation. Increased levels of magnetite in the feed to the niobium mineral flotation stage of the disclosed process increases the magnetite mass reporting to the concentrate, thus lowering the resulting niobium grade of the concentrate. However, this may not affect the overall recovery of niobium in the niobium mineral flotation stage. The higher mass and lower grade concentrate may also increase both the cost and complexity of subsequent concentrate processing. For these reasons, in the optimized version of the disclosed process it is advantageous to remove magnetite prior to niobium mineral flotation. Care must be taken in the selection of the magnetic separation conditions to control losses of any niobium bearing minerals, and unliberated niobium minerals locked with magnetic or paramagnetic minerals.

Magnetic separation is performed by subjecting a process stream to a magnetic field and physically separating the magnetic and/or paramagnetic material from nonmagnetic material. The ground ore is passed through a magnetic separator to remove magnetite, as well as other targeted magnetic and/or paramagnetic minerals. Magnetic separation may be conducted on dry material or on slurries. Magnetic separation may be applied as a pre-flotation, or an intra-flotation removal stage, to whole or partial streams which are then subjected to flotation. Magnetic separation may also be applied to flotation concentrates. Successful niobium mineral concentration is possible in the absence of magnetic separation, but to a lower grade concentrate if magnetite is present in the ore, as outlined above. The degree to which magnetic separation is required is dependent upon the magnetic and paramagnetic minerals present in the specific ore being processed and their amenability to being collected in the downstream processes.

During development of the disclosed process, magnetic separation was undertaken as a pretreatment measure, and on intermediate flotation products. For the ore used to develop the invention, low intensity magnetic separation applied directly after the comminution stage was found to provide optimized removal of magnetite. All processes following magnetic separation are based on ore and water slurries.

At step 130, which is part of optimized process 2000 and also of optimized process 3000, dispersion is performed. Experimental work has shown the addition of chemicals with known dispersing properties participates in improved selectivity of the subsequent direct niobium mineral flotation process. The addition of a dispersant chemical can have multiple impacts on the physio-chemical response of slurries. Chemicals with dispersant properties disperse gangue and fine particles, preventing their interference in the flotation process; interact with specific mineral surfaces, acting as a depressant; and exhibit water softening properties, removing dissolved ions in solution from participation in the flotation process. Discussions of dispersant in this document are understood to refer to chemicals exhibiting one or more of these described properties. During the development of the disclosed process chemicals with dispersing properties used included: sodium hexametaphosphate, sodium tripolyphosphate, carboxymethyl cellulose, and polycarboxylic acid. Experimental work has shown that the addition of one or more dispersant chemicals can increase selectivity, lower concentrate mass pull, and increase concentrate grades. Some dispersants, like polycarboxylic acid when used with the prototype ore, may act in a way such that the gangue and fine particles do not form a suspension when allowed to settle. Other dispersants, like sodium hexametaphosphate when used with the prototype ore, may act in a way such that gangue and fine particles remain in suspension when process slurry is allowed to settle. Experimental work has shown that the process is effective without the removal of gangue and fine particle suspensions on the prototype ore. However, if gangue and fine particles are present in a sufficient quantity they may interfere with flotation processes in a variety of ways. These ways may include co-flotation with the target mineral(s), increased the mass pull to concentrate, poor froth characteristics, and decreased flotation concentrate grade. This co-flotation of gangue and fine particles is differentiated from collection of minerals in that gangue and fine particle flotation typically does not consume significant niobium collector.

If a dispersant is used, step 130, which results in a suspension of colloidal or gangue and fine particles, or if a suspension of gangue and fine particles occurs without dispersion, the partial physical removal of these gangue and fine suspended particles, step 140, can be accomplished by a number of mechanisms including classification, settling, or partial settling of the slurry with removal of all or a portion of the fluid. Typical industrial methods of effecting this separation include but are not limited to settling and decantation, elutriation, hydrocycloning and thickening.

The extent to which gangue and fine particles will be present in a particular process slurry is related to the mineralogical characteristics of the specific ore being processed, the target particle size selected for the process, and the comminution equipment selected for the process. The determination of whether or not it may be advantageous to disperse and/or partially remove gangue and fine particles prior to niobium mineral flotation should be made based on the characteristics of the particular ore being processed. Similarly, the degree to which dispersion and/or removal of gangue and fine particles should be conducted is also dependent on the characteristics of the particular ore being processed.

Work on the optimized processes 2000 and 3000 focused on the use of sodium hexametaphosphate as a dispersant for the prototype ore used in the development of the disclosed process. Work on the optimized process also included decantation as a method of removing a portion of the fine suspended material. Decantation was selected in the optimized process due to expediency in test work execution at the scale the work was conducted.

At step 150, sulphide removal may optionally be performed to remove sulphide minerals, if present in the ore, from the process slurries. Sulphide removal is a process stage whereby sulphide minerals are separated from the remainder of the ore. In the ore used for development of the disclosed process, the sulphide mineral pyrite was removed prior to niobium mineral flotation as pyrite was found to consume niobium flotation collector and co-float with the niobium bearing minerals. The co-flotation of sulphide minerals with niobium minerals can result in reduced overall recovery of niobium in the disclosed process, increased reagent consumption or a combination of these effects. The flotation of sulphide minerals in the niobium mineral flotation circuit will also reduce the niobium grade of the flotation concentrate and result in the niobium concentrate containing increased levels of sulphur. The resultant concentrate with higher mass, lower grade and increased sulfur levels may also incur additional cost and complexity in subsequent concentrate processing. One of the end products produced from niobium mineral concentrates is ferroniobium alloy, which is predominantly used in the production of a variety of alloy steels. Sulphur is considered an impurity in alloy steel products and is tightly controlled in the feed stocks used in alloy steel production. For these reasons, it may be advantageous to remove any sulphide minerals present which co-float in the disclosed process prior to direct niobium mineral flotation. Although a comprehensive suite of sulphide minerals was not tested in the development of the disclosed process to determine all of the sulphide minerals which will co-float with niobium minerals, most sulphide minerals which are found to report to the niobium concentrate can be effectively removed by the application of standard industrial techniques as outlined herein.

The dominant industrial process for the selective removal of sulphide bearing minerals is froth flotation. Froth flotation is extensively used at the industrial scale to selectively recover copper, lead, zinc, iron, nickel and molybdenum sulphides. The ore utilized in the development of the disclosed process contained iron sulphide minerals which reported to the niobium concentrate. A skilled practitioner would be able to apply this flotation principle to other sulphide minerals if they exhibited detrimental impact to the direct niobium mineral flotation process, such as but not limited to, increased reagent consumption and/or recovery of sulphide minerals to the niobium mineral flotation concentrate. In sulphide removal, a process stream is subjected to a sulphide flotation stage (or stages) utilizing suitable chemicals as required by the specific ore acting as collectors, dispersants, promoters, activators, and frothers. Suitable flotation conditions including but not limited to slurry density, gas rate and conditioning time need to be selected to allow the flotation stage to effectively separate the sulphide minerals. Slurry densities over the range of common flotation densities may be utilized and should be optimized for the specific ore being processed. The sulphide flotation may be conducted at a pH appropriate in order to facilitate the removal of the specific sulphide mineral species. The collector and frother additions may be added prior to flotation or in a staged fashion. For example, a portion of the reagent may be added prior to the start of the sulphide flotation step, and another portion of the reagent may be added during the actual flotation. Suitable promoters, activators, dispersants and other agents may be utilized in a similar fashion to that described above.

During the development of the disclosed process, sulphide removal was undertaken specifically targeting the mineral pyrite. Pyrite was the predominant sulphide mineral in the prototype ore. Tailings from the magnetic separation stage were subjected to froth flotation at an unaltered pH using xanthate as a collector and a propylene frother in the optimized process.

Niobium mineral flotation 170 is the core stage of the disclosed process which separates the niobium bearing minerals from the remainder of the ore into a high grade, high recovery, low mass yield concentrate which is suitable for further processing into saleable products. The disclosed process is able to selectively concentrate niobium minerals from a carbonatite host rock without the prior removal or reduction of a range of carbonate minerals which interfere with the current industrial niobium mineral flotation process, including, but not limited to limestone, dolomite, and apatite. The disclosed process uses aromatic hydroxamic acids (also known as hydroxamates) such as benzohydroxamic acid, and/or naphthenic hydroxamic acid, and/or salicylic hydroxamic acid as the flotation collector in combination with one or more soluble or semi-soluble lead salts such as lead nitrate, lead chloride, lead formate, lead citrate, lead acetate, or lead hydroxide as a flotation performance modifier. The use of aromatic hydroxamic acid collectors in the disclosed process is distinguished from the work conducted by others in the field in that the disclosed process:

Can utilize industrial grade/purity hydroxamic acids in place of chemically pure hydroxamic acid with similar grade/recovery results.

Extends beyond benzohydroxamic acid and can utilize other aromatic hydroxamic acids such as naphthenitic hydroxamic acid and/or salicylic hydroxamic acid as a niobium collector.

Utilizes one or more soluble or semi-soluble lead salts such as lead nitrate, lead chloride, lead formate, lead citrate, lead acetate, or lead hydroxide as a flotation performance modifier to improve flotation performance and reduce the dosage of the aromatic hydroxamic acid (be they reagent grade or a range of industrial grades) collector required to recover the niobium minerals. The selection of specific lead salt and dosage will be dependent upon the nature of the ore being processed and economics of a particular project.

The disclosed process can successfully perform niobium mineral flotation using chemically pure benzohydroxamic acid, various industrial grades of benzohydroxamic acid ranging from 30% to 85% activity, as well as with industrial grade naphthenic hydroxamic acid and/or salicylic hydroxamic acid. The dosage of an industrial grade aromatic hydroxamic acid should be adjusted based on the stated chemical activity of the reagent being used. In this manner, effective flotation can be achieved with differing industrial grades of collector material. At the lower end of the stated activity range for industrially available products, flotation selectivity may be reduced with more non-target mineral species reporting to flotation concentrates. The effectiveness of the aromatic hydroxamic acid collectors is enhanced by the application of one or more soluble lead salts, specifically lead nitrate, lead chloride, lead formate, lead citrate, or lead acetate. The effectiveness of the aromatic hydroxamic acid collectors is also enhanced by the application of the semi-soluble lead salt lead hydroxide. The choice and dosage of collector species, collector grade, and lead salt can be determined for each ore being processed based on the specific economics of processing that ore.

Aromatic hydroxamic acids are typically supplied in a solid state at room temperature and these solid collectors were prepared by dissolving them in water prior to addition to the flotation slurry for ease of dosing in the development of the disclosed process. During the development of the disclosed process, aromatic hydroxamic acid solutions were prepared at temperatures between 35 and 90 degrees Celsius. Aromatic hydroxamic acid solutions were prepared in the optimized process at 65 degrees Celsius and at a strength of 2% by weight. Reagent make-up temperatures above the optimized reagent makeup temperature of 65 degrees Celsius exhibited no adverse effect to the overall process result. Reagent makeup temperatures below the optimized reagent makeup temperature of 65 degrees Celsius exhibited reduced grade and recovery performance in flotation. The effectiveness of the hydroxamic acid collector may be affected by temperature and the process for each ore should be optimized based on the economics of that ore to determine an acceptable balance of process slurry temperature, reagent consumption and reagent makeup method.

Froth flotation was conducted at slurry temperatures of 35 degrees Celsius in the optimized process. Froth flotation was conducted over a range of slurry temperatures from 15 to 60 degrees Celsius. Flotation between 30 and 40 degrees Celsius exhibited optimum flotation performance. Outside of this range some performance degradations were observed. Flotation performance below 30 degrees Celsius and down to 25 degrees Celsius shows a decline in recovery and grade. Below 25 degrees Celsius flotation performance declines more rapidly. Flotation performance is impacted by lower temperatures through increased mass pull to concentrate, lower concentrate grade and lower recovery of niobium minerals. Flotation tests performed above 40 degrees Celsius indicate that the recovery mechanism functions, but overall performance declines and it becomes increasingly difficult to maintain a suitable froth bed. Careful specification of the frother(s) to be used should be undertaken if a particular ore or the economics of a particular project justifies the use of temperatures above those used in the optimized process.

One or more soluble lead salts, such as lead nitrate, lead chloride, lead formate, lead citrate, or lead acetate was dissolved in water prior to addition to the flotation slurry for ease of dosing during the development of the disclosed process. In the case of semi-soluble lead salts, such as lead hydroxide, the lead salt was partially dissolved in water prior to addition of both solid and liquid portion of the mixture being added to the flotation slurry. The optimized process utilized the addition of lead salt prior to the addition of aromatic hydroxamic acid collector. The addition of collector before lead salt resulted in functionally equivalent grade and recovery performance outcomes. The addition of lead salt and collector concurrently results in marginally reduced mass recovery to concentrate with a higher grade and lower recovery as compared to the sequential reagent addition cases.

In the development of the disclosed process conditions were tested with aromatic hydroxamic acid collector dosages ranging between 200 g/t and 5750 g/t, and lead salt dosages ranging from 50 g/t to 900 g/t. The optimum dosage for each ore needs to be determined based on the specific ore mineralogy, grade, and process response of that material.

In the disclosed process, niobium mineral flotation collector(s) and modifier reagents may be added to an agitated slurry and allowed to condition prior to flotation, as depicted in step 160. Conditioning time for the niobium mineral flotation reagents is an optional stage of the process as the reagents tend to be fast acting and may be stage dosed if required. However, reagent conditioning times may be further investigated for each ore processed to determine the reagent conditioning time which provides the best utilization of the reagents and the economic optimum reagent dosages for the ore. The disclosed process niobium mineral flotation stage may be successfully conducted over the range of typical flotation slurry densities. The range of 16% to 32% solids was tested for rougher flotation with cleaner flotation densities down to 5% during the development of the disclosed process. In practice, the minimum and maximum densities at which the process may be conducted are a function of the process machinery selected and project economics, not a feature of the disclosed process. Although the process is effective over a large range of densities, generally the higher the flotation density the higher the entrainment of gangue minerals in the concentrate, as is typical of selective flotation processes. The flotation pH may be modified with various acids (such as but not limited to sulphuric, nitric, hydrochloric, carbonic acid, etc. and through the use of carbon dioxide gas) and bases (such as but not limited to caustic soda, calcium hydroxide, soda ash, potassium hydroxide, sodium hydroxide, etc.); however, the flotation process functions most effectively at unaltered ore slurry pH values ranging between approximately 6.9 and 8.5 in the optimized process. Adjustment of flotation pH with a variety of acids achieved successful flotation down to a pH as low as 6.5, with declining performance at the lower pH range. The use of a variety of bases to increase the slurry pH resulted in successful flotation to a pH value as high as 10, with declining performance at the higher pH range. Flotation at a pH above 10 resulted in a sharp reduction in performance. The addition of soluble or semi-soluble lead salts does temporarily modify the pulp pH, but this effect is not detrimental to the process.

A set of optimized conditions was developed for the ore targeting the criteria of high recovery, high concentrate grade, low mass yield, and high collector efficiency.

In the optimized process, lead nitrate was added to the niobium mineral flotation circuit feed first and allowed to condition briefly before the addition of a benzohydroxamic acid based collector. The conditioning step 160 was conducted at a slurry density of approximately 50% solids by weight with high intensity mixing. The use of a high slurry density and high intensity mixing during the conditioning ensures sufficient contact between the minerals and the reagents. Control of the mineral to collector contact is increasingly important at finer particle sizes. A propylene based frother was used in the optimized process, but is not the subject of the invention as any frother which produces a stable flotation froth could be employed.

The optimized process reagent dosages for the prototype ore was 300 g/t lead nitrate and an activity adjusted 500 g/t industrial grade benzohydroxamic acid collector. The benzohydroxamic acid collector dosage refers to the dosage of active hydroxamic acid in the reagent and is adjusted based on the activity (grade) of the reagent used. The optimized process utilized a 60% activity industrial grade benzohydroxamic acid and a flotation temperature of 35 degrees Celsius. The slurry density selected for rougher flotation was approximately 30%, and as the liberation size of the tested ore is fine the process benefits from higher agitation energies promoting fine particle contact with the flotation gas. Flotation is conducted at the unaltered ore pH value which is typically in the range of 6.9 to 8.5 using air as the flotation gas. Cleaning of the flotation rougher concentrate may be accomplished by dilution cleaning with or without additional flotation reagents. Cleaner flotation upgrade ratios are high allowing a final concentrate to be produced with fewer cleaning stages than the known commercial niobium mineral flotation processes. The disclosed process cleaner flotation step 180 is effective when conducted in open circuit and closed circuit configurations. Air is a suitable flotation gas for the process, although nitrogen may be effectively substituted if desired.

The optimized process on the prototype ore utilizes two stages of dilution cleaning to upgrade the niobium mineral concentrate produced by rougher flotation without the addition of an additional hydroxamic acid collector or flotation modifier. No additional frother was added during cleaning in the optimized process. However, the addition and dosage of frother will be dependent upon the nature of the ore being processed. The optimized cleaner circuit was configured as an open circuit first cleaner followed by a second cleaner operating in closed circuit with the first cleaner. However, the specific circuit configuration will be dependent upon the nature of the ore being processed and the needs of a particular project. Bench scale locked cycle tests of the optimized process utilizing both solids and solution recycle resulted in $Nb_2O_5$ concentrate grades of 27% with $Nb_2O_5$ recovery in excess of 76% into a concentrate mass yield of under 1.5% of the feed mass.

While the disclosed process is for direct flotation of niobium bearing minerals from a primary carbonatite host rock, the process may be applicable to other similar oxide rock types.

Preparation of the feed to the disclosed direct niobium mineral flotation circuit may, or may not, include a variety of mineral removal stages targeted at species which may interfere with downstream processes or have a potential impact on product quality. Specific targets for preprocessing stages included minerals containing iron, and sulfur. These processes may include, but are not limited to, removal by gravity, size classification, sedimentation, elutriation, magnetic separation, or flotation.

The direct niobium mineral flotation process described herein may be carried out using one or more aromatic hydroxamic acids, such as benzohydroxamic acid, naphthenic hydroxamic acid, or salicylic hydroxamic acid as a collector introduced to the process in combination with the addition of a lead salt flotation modifier as described in the invention. A solid aromatic hydroxamic acid collector may be prepared at elevated temperatures to produce a liquid solution.

A variety of species of chemicals with dispersant properties participate in the improvement of the selectivity of the direct niobium mineral flotation process disclosed herein. Other gangue and fines control chemicals strategies such as flocculants or surfactants may be used to control the deportment of gangue and fine particles. Physical techniques such as partial gangue and fine particle removal (via decant, elutriation columns, or thickeners) prior to direct niobium mineral flotation, controlling froth velocity in flotation, and froth washing may also be used to control the deportment of these gangue and fine particles. Selection of the frother species and dosing can also be a means of controlling gangue and fines deportment in direct niobium mineral flotation. However, any number of frother species and dosing regimes may be used in the direct niobium mineral flotation step of the disclosed process.

In the disclosed process, direct niobium mineral flotation was conducted at unaltered ore slurry pH values ranging between approximately 6.9 and 8.5 in the optimized process. Adjustment of flotation pH with a variety of acids or carbon dioxide gas achieved successful flotation down to a pH as low as 6.5, with declining performance at the lower pH range. The use of a variety of bases to increase the slurry pH resulted in successful flotation to a pH value as high as 10, with declining performance at the higher pH range. Flotation at a pH above 10 resulted in a sharp reduction in performance.

In the disclosed process, direct niobium mineral flotation is amenable to standard flotation circuit configurations which may include one or more dilution cleaning stages, with or without additional applications of the aromatic hydroxamic acid, dispersants, frothers, pH regulators, and other flotation performance modifiers. This includes the use of cleaner scavengers, regrind, and other industry standard flotation circuit configurations.

In the disclosed process, direct niobium mineral flotation produces a concentrate of niobium bearing minerals which is also amenable to a variety of subsequent concentrate processing stages targeted at the removal of mineral species or elemental content which may interfere with downstream processes or have an adverse effect on final product quality. The final product of the majority of the niobium production is ferro-niobium alloy and specific targets in these concentrate processing stages may include minerals containing iron, phosphorous, and sulphur. These processes may include, but are not limited to, removal by gravity, magnetic separation, leaching, roasting, or flotation. Additional final products other than ferro-niobium may be produced and may require a range of different concentrate processing stages.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

The above-described embodiments are intended to be examples of the present invention and alterations and modifications may be effected thereto, by those of skill in the art, without departing from the scope of the invention, which is defined solely by the claims appended hereto.

What is claimed is:

1. A process for niobium mineral concentration comprising performing niobium mineral flotation, on a sufficiently liberated ore slurry, using:
   at least one aromatic hydroxamate collector; and
   at least one lead salt as a performance modifier,
   wherein the at least one aromatic hydroxamate collector is selected from the group consisting of: benzohydroxamic acid, naphthenic hydroxamic acid, and salicylic hydroxamic acid; and the at least one lead salt is selected from the group consisting of: lead nitrate, lead acetate, lead chloride, lead formate, lead citrate, and lead hydroxide, and
   wherein the dosage of the aromatic hydroxamate collector is from 200 g/t to 5750 g/t, and the dosage of the lead salt is from 50 g/t to 900 g/t.

2. The process of claim 1, wherein the aromatic hydroxamate collector is benzohydroxamic acid.

3. The process of claim 1, wherein the aromatic hydroxamate collector is naphthenic hydroxamic acid.

4. The process of claim 1, wherein the aromatic hydroxamate collector is salicylic hydroxamic acid.

5. The process of claim 1, wherein the lead salt is lead nitrate.

6. The process of claim 1, wherein the lead salt is lead acetate.

7. The process of claim 1, wherein the lead salt is lead chloride.

8. The process of claim 1, wherein the lead salt is lead formate.

9. The process of claim 1, wherein the lead salt is lead citrate.

10. The process of claim 1, wherein the lead salt is lead hydroxide.

11. The process of claim 1, wherein the lead salt performance modifier is added to the liberated ore slurry before the aromatic hydroxamate collector is added.

12. The process of claim 1, wherein the lead salt performance modifier is added to the liberated ore slurry after the aromatic hydroxamate collector is added.

13. The process of claim 1, wherein the lead salt performance modifier and the aromatic hydroxamate collector are added to the liberated ore slurry at the same time.

14. The process of claim 1, wherein the liberated ore slurry contains pyrochlore.

15. The process of claim 1, wherein the liberated ore slurry contains fersmite.

16. The process of claim 1, wherein the liberated ore slurry contains columbite.

17. The process of claim 1, wherein the liberated ore slurry contains fergusonite.

18. The process of claim 1, wherein the liberated ore slurry contains niobium-containing rutile.

19. The process of claim 1, wherein the liberated ore slurry contains niobium-containing ilmenite.

20. The process of claim 1, wherein the niobium mineral flotation performed on the liberated ore slurry is performed at a flotation temperature of between 15 degrees Celsius to 60 degrees Celsius.

21. The process of claim 20, wherein the flotation temperature is between 30 degrees Celsius and 40 degrees Celsius.

22. The process of claim 1, wherein the niobium mineral flotation performed on the liberated ore slurry is performed at a pH range of 6.5 to 10.0.

23. The process of claim 22, further comprising the step of adjusting the pH to fall within the specified range.

24. The process of claim 1, wherein the niobium mineral flotation performed on the liberated ore slurry is performed at a pH range of 6.9 to 8.5.

25. The process of claim 1, further comprising mixing sufficiently liberated ore particles with water to produce the sufficiently liberated ore slurry, prior to performing the niobium mineral flotation.

26. The process of claim 25, further comprising comminution of a host rock to produce the sufficiently liberated ore particles.

27. The process of claim 1, further comprising performing magnetic separation on the liberated ore slurry for separating magnetic material, paramagnetic material, or both magnetic and paramagnetic material from nonmagnetic material.

28. The process of claim 1, further comprising adding at least one chemical with dispersing properties.

29. The process of claim 28, wherein the at least one chemical with dispersing properties is sodium hexametaphosphate.

30. The process of claim 28, wherein the at least one chemical with dispersing properties is sodium tripolyphosphate.

31. The process of claim 28, wherein the at least one chemical with dispersing properties is carboxymethyl cellulose.

32. The process of claim 28, wherein the at least one chemical with dispersing properties is polycarboxylic acid.

33. The process of claim 28, further comprising partial physical removal of dispersed suspensions of fine particles.

34. The process of claim 1, further comprising partial physical removal of suspensions of fine particles.

35. The process of claim 1, further comprising sulphide removal by flotation.

36. The process of claim 35, wherein the at least one aromatic hydroxamate collector used for conditioning is benzohydroxamic acid.

37. The process of claim 1, further comprising separate conditioning of the sufficiently liberated ore slurry with at least one aromatic hydroxamate collector and at least one lead salt prior to the niobium mineral flotation.

38. The process of claim 37, wherein:
   the at least one aromatic hydroxamate collector used for the separate conditioning is selected from the group consisting of: benzohydroxamic acid, naphthenic hydroxamic acid, and salicylic hydroxamic acid; and
   the at least one lead salt used for the separate conditioning is selected from the group consisting of: lead nitrate, lead acetate, lead chloride, lead formate, lead citrate, and lead hydroxide.

39. The process of claim 37, wherein the at least one aromatic hydroxamate collector used for conditioning is naphthenic hydroxamic acid.

40. The process of claim 37, wherein the at least one aromatic hydroxamate collector used for conditioning is salicylic hydroxamic acid.

41. The process of claim 37, wherein the at least one lead salt used for conditioning is lead nitrate.

42. The process of claim 37, wherein the at least one lead salt used for conditioning is lead acetate.

43. The process of claim 37, wherein the at least one lead salt used for conditioning is lead chloride.

44. The process of claim 37, wherein the at least one lead salt used for conditioning is lead formate.

45. The process of claim 37, wherein the at least one lead salt used for conditioning is lead citrate.

46. The process of claim 37, wherein the at least one lead salt used for conditioning is lead hydroxide.

47. The process of claim 1, further comprising cleaner flotation of niobium for concentrate upgrading.

* * * * *